(12) United States Patent
Ryan

(10) Patent No.: US 9,581,293 B2
(45) Date of Patent: Feb. 28, 2017

(54) REFILLABLE AND RECHARGEABLE GREASE GUN RESERVOIR

(71) Applicant: Michael C. Ryan, Mitchellville, IA (US)

(72) Inventor: Michael C. Ryan, Mitchellville, IA (US)

(*) Notice: Subject to any disclaimer, the term of this patent is extended or adjusted under 35 U.S.C. 154(b) by 53 days.

(21) Appl. No.: 14/746,629

(22) Filed: Jun. 22, 2015

(65) Prior Publication Data

US 2015/0285436 A1 Oct. 8, 2015

Related U.S. Application Data

(63) Continuation of application No. 13/916,569, filed on Jun. 12, 2013, now Pat. No. 9,062,826.

(51) Int. Cl.
| | | |
|---|---|---|
| *F01M 11/04* | (2006.01) | |
| *F16N 21/00* | (2006.01) | |
| *F16N 19/00* | (2006.01) | |
| *F16N 5/00* | (2006.01) | |
| *F16N 11/04* | (2006.01) | |
| *F16N 11/10* | (2006.01) | |

(52) U.S. Cl.
CPC ............... *F16N 19/00* (2013.01); *F16N 5/00* (2013.01); *F16N 11/04* (2013.01); *F16N 11/10* (2013.01)

(58) Field of Classification Search
CPC . F16N 3/12; F16N 11/10; F16N 11/08; F16N 5/02; G01F 11/026
USPC ........................................... 184/105.2, 105.1
See application file for complete search history.

(56) References Cited

U.S. PATENT DOCUMENTS

| | | | | | |
|---|---|---|---|---|---|
| 3,627,178 A | * | 12/1971 | Sundholm | ................. | F16N 3/12 184/105.2 |
| 3,780,830 A | * | 12/1973 | Helgerud | ................. | F16N 3/12 184/105.2 |
| 3,788,427 A | * | 1/1974 | Fox | ........................... | F16N 5/02 184/105.3 |
| 3,938,623 A | * | 2/1976 | Winston | ................. | F16N 13/08 184/28 |
| 3,987,869 A | * | 10/1976 | Bowers | ................... | F16N 13/10 184/105.1 |
| 4,077,493 A | * | 3/1978 | Spaude | ..................... | F16N 3/12 184/105.2 |
| 4,077,494 A | * | 3/1978 | Spaude | ................... | F16N 13/06 184/105.2 |
| 4,083,428 A | * | 4/1978 | Ness | ........................ | F16J 1/008 184/105.2 |
| 4,157,773 A | * | 6/1979 | Schetina | ................. | F16N 11/10 184/29 |
| 4,298,144 A | * | 11/1981 | Pressl | ....................... | F16N 3/12 184/105.2 |
| 4,664,298 A | * | 5/1987 | Shew | ....................... | F16N 3/12 184/105.2 |
| 4,676,409 A | * | 6/1987 | Stolz | ........................ | F16N 3/12 184/105.1 |
| 4,819,764 A | * | 4/1989 | Huang | ................... | F16N 13/10 184/36 |
| 5,044,471 A | * | 9/1991 | Machek | .................... | F16N 3/12 184/105.2 |

(Continued)

*Primary Examiner* — Henry Liu
(74) *Attorney, Agent, or Firm* — Prudens Law LLC

(57) ABSTRACT

A refillable reusable grease gun reservoir has grease inlet and outlet ports coupled with dry break fittings enabling the reservoir to be used and refilled. The reservoir may be filled through the top and/or bottom of the reservoir body.

3 Claims, 9 Drawing Sheets

(56) References Cited

U.S. PATENT DOCUMENTS

| | | | | |
|---|---|---|---|---|
| 5,067,591 A * | 11/1991 | Fehlig | F16N 5/02 | 141/21 |
| 5,105,912 A * | 4/1992 | Heister | F16N 3/12 | 184/105.2 |
| 5,109,955 A * | 5/1992 | Clark | F16N 37/003 | 184/105.2 |
| 5,199,614 A * | 4/1993 | Husman | B05B 11/0048 | 184/105.2 |
| 5,277,339 A * | 1/1994 | Shew | F16N 3/12 | 184/105.2 |
| 5,404,967 A * | 4/1995 | Barry | F16N 3/12 | 184/105.1 |
| 5,474,214 A * | 12/1995 | Chung | F16N 5/02 | 222/262 |
| 5,730,250 A * | 3/1998 | Tsai | F16N 13/20 | 184/105.2 |
| 5,826,753 A * | 10/1998 | Fehlig | F16N 3/12 | 184/105.2 |
| 5,918,702 A * | 7/1999 | Cheng | B05C 17/00569 | 184/105.2 |
| 6,122,966 A * | 9/2000 | Goodman | F16C 33/6625 | 184/105.2 |
| 6,494,347 B1 * | 12/2002 | Yeh | F16N 3/12 | 184/105.2 |
| 6,736,292 B2 * | 5/2004 | Grach | G01F 11/026 | 222/262 |
| 6,923,348 B2 * | 8/2005 | Grach | G01F 11/026 | 222/262 |
| 7,032,713 B2 * | 4/2006 | Huang | F16N 11/08 | 184/105.1 |
| 7,044,404 B1 * | 5/2006 | Kricheldorf | B05B 9/0811 | 137/206 |
| 7,178,700 B2 * | 2/2007 | Song | F16N 3/12 | 184/105.2 |
| 7,267,198 B2 * | 9/2007 | Cen | F16N 3/12 | 184/105.2 |
| 7,377,406 B2 * | 5/2008 | Linkletter | G01F 11/026 | 184/105.2 |
| 7,469,803 B2 * | 12/2008 | Weems | F16N 3/12 | 184/105.2 |
| 7,584,871 B2 * | 9/2009 | Huang | F16N 3/12 | 184/105.2 |
| 8,002,000 B2 * | 8/2011 | Pericard | B65B 31/003 | 141/10 |
| 8,118,137 B2 * | 2/2012 | Cerveny | F16N 3/12 | 184/105.2 |
| 8,235,253 B2 * | 8/2012 | Shew | F16N 3/12 | 184/105.2 |
| 8,297,476 B2 * | 10/2012 | Weems | F16N 3/12 | 184/105.2 |
| 8,517,224 B2 * | 8/2013 | Kuo | F16N 3/12 | 184/105.2 |
| 8,701,838 B2 * | 4/2014 | Kreutzkamper | F16N 19/00 | 184/105.1 |
| 8,844,584 B1 * | 9/2014 | Haley | B65B 31/003 | 141/20 |
| 8,915,331 B2 * | 12/2014 | Alekseyev | H02P 7/08 | 184/105.2 |
| 8,955,544 B2 * | 2/2015 | Gurney | F16L 37/138 | 137/539 |
| 9,062,826 B2 * | 6/2015 | Ryan | F16N 19/00 | |
| 9,376,228 B1 * | 6/2016 | Haley | B65B 31/003 | |
| 2003/0037995 A1 * | 2/2003 | Patterson | F16N 11/04 | 184/105.1 |
| 2004/0099484 A1 * | 5/2004 | Chen | F16N 3/12 | 184/105.2 |
| 2004/0112680 A1 * | 6/2004 | Chou | F16N 11/10 | 184/105.2 |
| 2004/0231927 A1 * | 11/2004 | Huang | F16N 11/08 | 184/105.2 |
| 2005/0258005 A1 * | 11/2005 | Chen | F16N 11/08 | 184/105.2 |
| 2006/0070812 A1 * | 4/2006 | Eggleton | F16N 3/12 | 184/105.2 |
| 2006/0108180 A1 * | 5/2006 | Grach | F16N 3/12 | 184/105.2 |
| 2006/0196727 A1 * | 9/2006 | Shields | B62D 55/092 | 184/29 |
| 2006/0219482 A1 * | 10/2006 | Tung | F16N 3/12 | 184/105.2 |
| 2007/0034451 A1 * | 2/2007 | Liao | F16N 37/003 | 184/5.1 |
| 2007/0137941 A1 * | 6/2007 | Chang | F16N 3/12 | 184/105.2 |
| 2007/0137942 A1 * | 6/2007 | Weems | F16N 5/02 | 184/105.2 |
| 2008/0017449 A1 * | 1/2008 | Liao | F16N 11/08 | 184/5.1 |
| 2008/0060879 A1 * | 3/2008 | Orlitzky | B01J 7/02 | 184/39 |
| 2009/0133962 A1 * | 5/2009 | Orlitzky | F16N 13/14 | 184/37 |
| 2009/0229920 A1 * | 9/2009 | Yang | F16N 11/04 | 184/7.4 |
| 2009/0321187 A1 * | 12/2009 | Shindo | F16K 51/02 | 184/5 |
| 2010/0116850 A1 * | 5/2010 | Weems | F16N 3/12 | 222/256 |
| 2010/0147893 A1 * | 6/2010 | Shew | F16N 3/12 | 222/256 |
| 2010/0206913 A1 * | 8/2010 | Pericard | B65B 31/003 | 222/387 |
| 2010/0294808 A1 * | 11/2010 | He | F16N 3/12 | 222/256 |
| 2012/0145482 A1 * | 6/2012 | Ifield | F16N 7/385 | 184/6 |
| 2012/0217094 A1 * | 8/2012 | Ling | F16N 13/16 | 184/55.1 |
| 2013/0081903 A1 * | 4/2013 | Alekseyev | H02P 7/08 | 184/26 |
| 2013/0313051 A1 * | 11/2013 | Hung | F16N 5/02 | 184/41 |

* cited by examiner ately means that one comes into contact with grease residue
REFILLABLE AND RECHARGEABLE GREASE GUN RESERVOIR The present application claims priority to and the benefit of U.S. Pat. No. 9,062,826 filed on Jun. 12, 2013, which claims priority to and benefit of U.S. Provisional Application No. 61/658,661 filed on Jun. 12, 2012, the contents of which are incorporated herein by reference.

BACKGROUND OF THE INVENTION

1. Field of the Invention

The present invention is generally related to the operation of grease guns. More particularly, the present invention pertains to a system and method for refilling the reservoir of a grease gun.

2. Introduction

Grease guns utilize a reservoir, for example, tubes or cartridges, to hold grease while a plunger, pull rod mechanism, or other similar mechanism forces grease from the reservoir to a dispenser. When the gun runs out of grease, the tube in reservoir is usually replaced. Replacing the reservoir generally means removing the spent tube or cartridge and replacing it with a new one. Replacing the reservoir also means that one comes into contact with grease residue contained in the old reservoir or grease from the new reservoir resulting in an unwanted mess. Moreover, disposal of the spent reservoir becomes an environmental concern because of the remaining grease residue. Though the grease gun has been improved over the years, grease residue resulting from the process of switching from an old grease reservoir to a new grease reservoir remains an issue.

For example, to remove a spent tube of grease, one must first grasp the T-bar that is fixed to the outer end of the pull rod mechanism at the bottom outer portion of the grease reservoir. In drawing the pull rod out through the bottom of the grease reservoir, the wiper piston is also pulled back through the spent tube of grease due to the design of the pressure mechanism of the grease gun. The pressure mechanism is made up of the pull rod with a T-handle affixed to the outer end portion for one to grab onto. The piston rod runs the full length of the grease reservoir. A compression spring runs the full length inside the grease reservoir. The piston rod slides through a slotted hold in the bottom of the grease reservoir and traverses fully through the center of the compression spring inside the grease reservoir. The piston rod slides through the center of the wiper piston and has its end buttoned off so that it cannot slide backward out of the piston. This design enables one to draw the wiper piston back through the spent grease tube and compress the compression spring. The piston rod being drawn out completely compresses the compression spring and places the wiper piston at the bottom of the spent tube of grease. To hold the pressure of the compression spring in this compressed condition while replacing the spent tube of greases causes one to rotate the piston rod sideways into the slot at the bottom of the grease reservoir where it engages a machined ring in the piston rod below the wiper piston to reveal itself outside the bottom of the grease reservoir.

Next, one needs to unscrew the grease reservoir from the head of the grease gun. Removal reveals the outer ring of the spent grease tube in the grease reservoir. The spent grease tube can now be removed as the piston rod assembly has been fixed at the bottom of the grease reservoir.

After removing the spent tube, a full tube of grease is inserted into the grease reservoir housing assembly. Fully inserting the new tube of grease into the reservoir housing bases the grease in the bottom of the new tube of grease to come into contact with the wiper piston being held in place by the pull rod. The grease reservoir is rethreaded into the head of the grease gun. After securing the two operating members together, the pull rod is rotated out of the slot assembly at the bottom of the grease reservoir. The pressure generated by the compression spring is fully transferred to the wiper piston that is in contact with new grease in the tube. The pull rod must be pushed into and through the new grease in the new tube so that the T-bar handle shows at the bottom of the grease reservoir. As grease is consumed, the wiper piston continues to slide along the pull rod being pushed by the compression spring and applying pressure to the grease in the tube to force it towards the head of the grease gun where the grease engages with the gun's pumping mechanism.

As described above, changing grease tubes in grease guns involve multiple steps and a mess that needs to be cleaned up. What is needed is a system that eliminates or partially eliminates the need for a pull rod mechanism and its associated functionality.

SUMMARY OF THE INVENTION

While the way in which the present invention addresses the disadvantages of the prior art will be discussed in greater detail below, in general, the present invention provides for a refillable grease gun reservoir body.

The reservoir body includes a tube defining an inner area that contains the grease and the pressure mechanism. Depending on the embodiment, the inner area may also contain a bladder that contains the grease within the inner area. Fitting/couplings are situated at the top of the reservoir body for making connections to grease guns, refill apparatus, or other systems as needed. The fitting/couplings prevent the flow of grease from the bladder upon disconnection from the grease gun or other apparatus. Within the fitting/couplings are grease ports coupled to the container for grease. In some embodiments, the grease ports serve as inlet and outlet ports. In other embodiments, the grease ports are either an inlet port or an outlet port. A pressure mechanism is situated within the inner area that forces the grease from the inner area through a port to the head of the grease gun. The reservoir body is refillable through a combination inlet/outlet port or an inlet port.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are described in detail below. While specific implementations involving grease gun reservoirs are described, it should be understood that their description is merely illustrative and not intended to limit the scope of the various aspects of the invention. A person skilled in the relevant art will recognize that other components and configurations may be easily used or substituted than those that are described here without parting from the spirit and scope of the invention. As will be appreciated by one of ordinary skill in the art, the system may be embodied as a customization of an existing system, an add-on product, and/or a stand-alone system.

The present invention facilitates refilling a grease gun reservoir. The invention provides a rechargeable reservoir body that can be adapted to function with existing grease gun systems or used with newly manufactured grease guns specific to the described grease gun reservoir body. The invention also includes a bulk grease delivery system used to charge an individual grease gun's reservoir. Thus, as will become apparent from the following descriptions, the present invention facilitates an efficient and environmentally friendly way to refill and recharge a reusable grease gun reservoir body.

Figure 1:
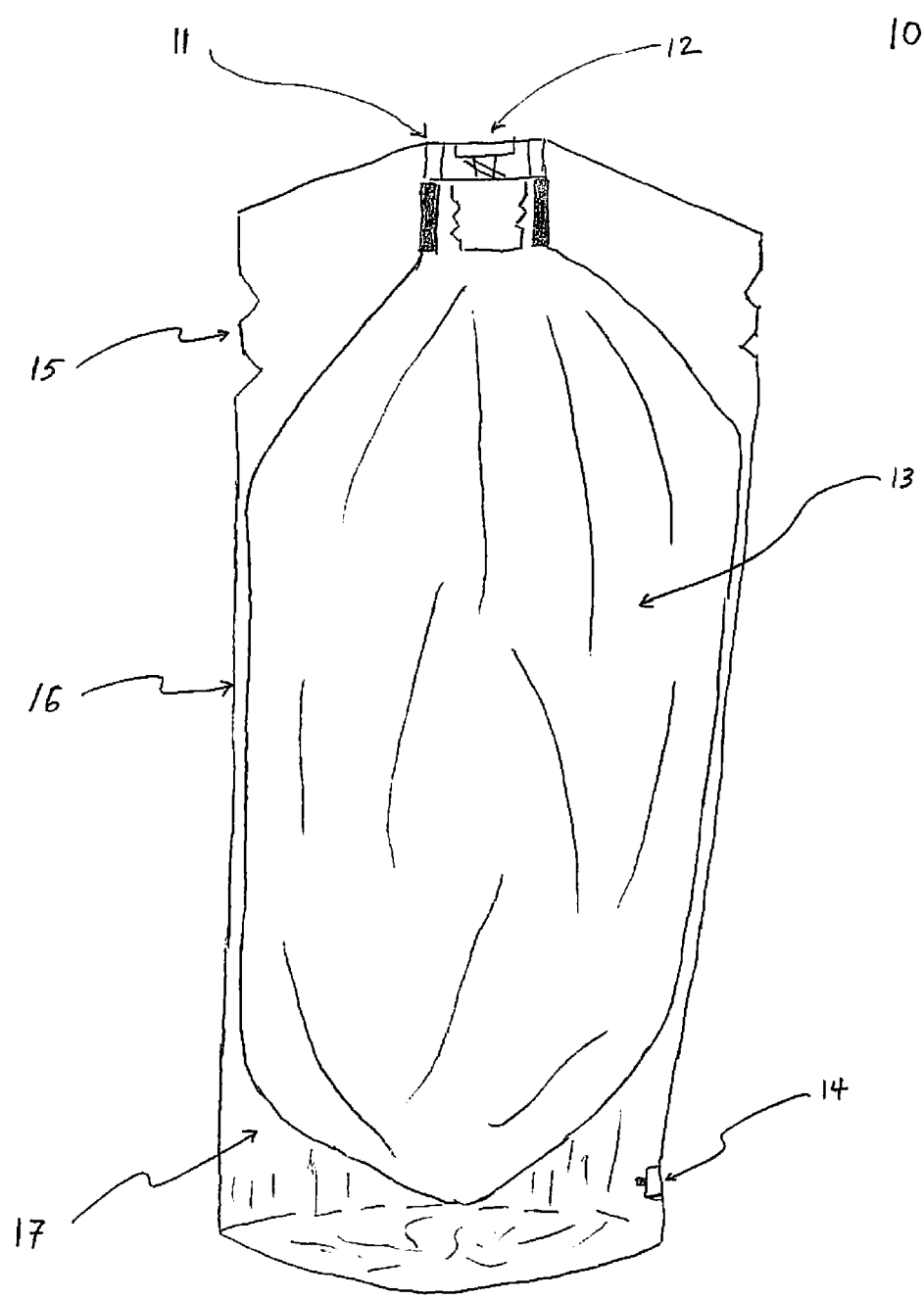
FIG. 1 illustrates an exemplary refillable grease gun reservoir utilizing an internal bladder.

FIG. 1 illustrates, an exemplary refillable grease gun reservoir utilizing an internal bladder 10 of the invention. A reservoir tube 16 is equipped with a fitting/coupling 11 on top of the reservoir tube for receiving a grease gun or a refilling apparatus. The reservoir tube 16 may be of any suitable material and shape designed to contained the elements of the invention. The tube may be any color or clear in order to see the amount of grease contained in the bladder 13. Preferably, the fitting/coupling 11 is a dry break fitting/coupling that automatically seals off grease flow when disconnected. In a preferred embodiment, fitting/coupling 11 also enables quick connect and disconnect to the grease gun and refilling apparatus. Fitting/couplings are well known in the grease gun art and will not be described. However, any type of fitting/coupling now known or known in the future that limits the grease flow when disconnected is within the spirit of the invention. The fitting/coupling 11 also may be equipped with a pressure relief mechanism. The fitting/coupling 11 encompasses a grease inlet/outlet port 12 that enables grease to flow from the bladder 13 to the grease gun. The grease inlet/outlet port 12 also is used to charge and refill the bladder 13 with grease. The bladder 13 is contained within the reservoir tube 16. The bladder 13 may be of any suitable material designed to contain grease and expand/contract while delivering grease or be filled with grease. The reservoir tube 16 may optionally be equipped with an additional pressure relief mechanism 14. Such mechanisms are well known in the art and will not be described. The reservoir tube 16 has an internal reservoir 17. The internal reservoir 17 may be charged with a gas, for example nitrogen, to act as an accumulator. When the grease gun is operated, the gas within the internal reservoir 17 expands causing pressure on the bladder 13, which distributes the grease through the grease inlet/outlet port 12. The reservoir tube 16 may have threads 15 situated on the outside of the tube for releasably attaching the tube to a grease gun, refilling apparatus, or storage apparatus.

Figure 2:
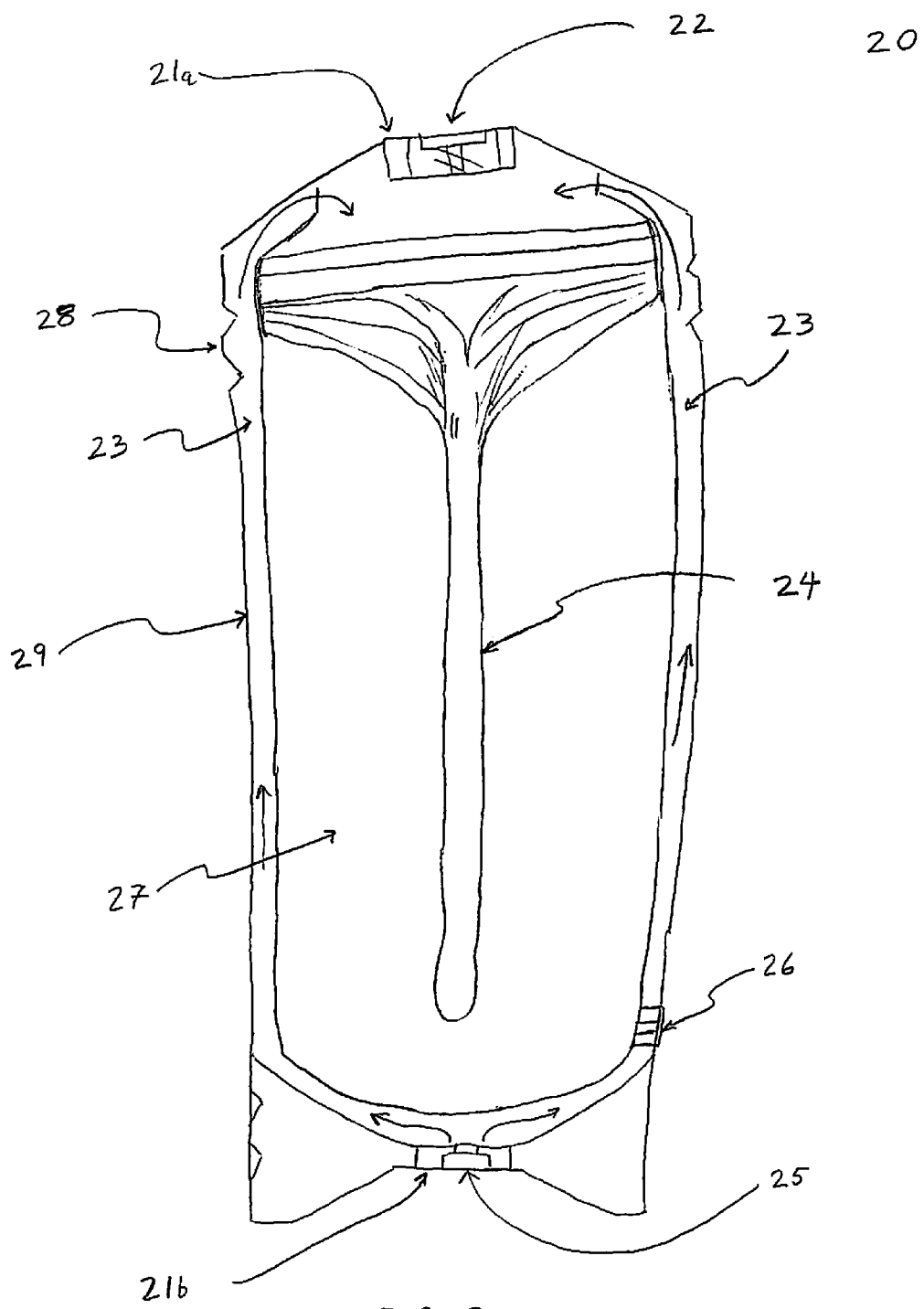
FIG. 2 illustrates an exemplary refillable grease gun reservoir utilizing an internal bladder that is refillable from the bottom of the reservoir.

Another embodiment of the present invention is illustrated in FIG. 2, which enables the refillable grease gun reservoir to be refilled from the bottom of the reservoir. FIG. 2 illustrates an exemplary refillable grease gun reservoir utilizing an internal bladder that is refillable from the bottom of the reservoir 20. The reservoir tube 29 is equipped with a fitting/coupling 21a, internal bladder 24, pressure relief mechanism 26, internal reservoir 27, and threads 28 similar to FIG. 1. However, because the reservoir is to be filled from the bottom of the body, reservoir tube is equipped with a grease outlet 22 for delivering grease to the grease gun and a separate grease inlet 25 for refilling the bladder 24 with grease. A grease refilling apparatus is connected to the fitting/coupling 12b. The grease is delivered to the bladder via a grease channel 23. The grease channel is contained by the reservoir tube 29, but is outside the internal reservoir 27.

Figure 3:
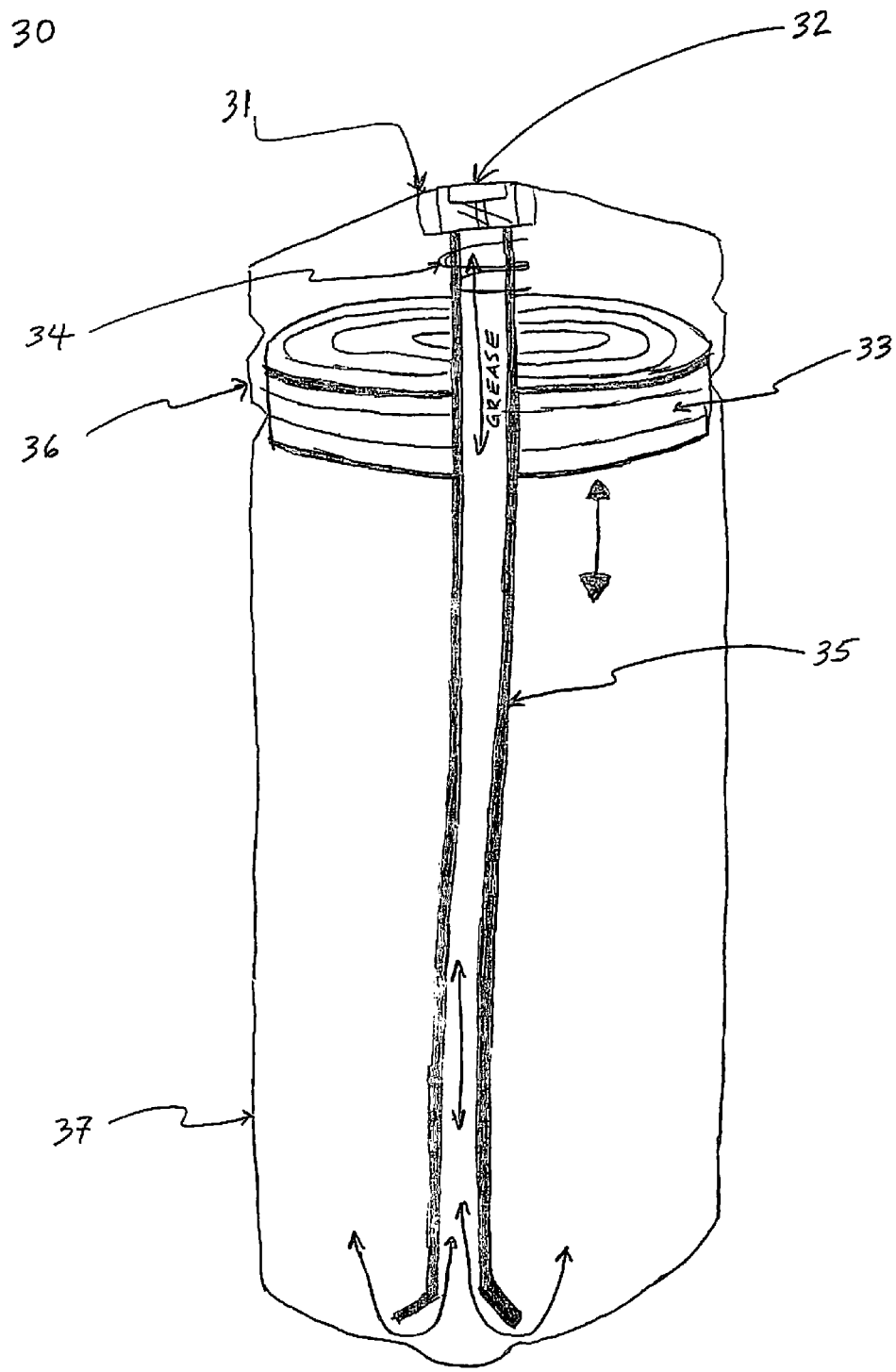
FIG. 3 illustrates an exemplary refillable grease gun reservoir utilizing an internal wiper plate that is refillable from the top of the reservoir.
Figure 4:
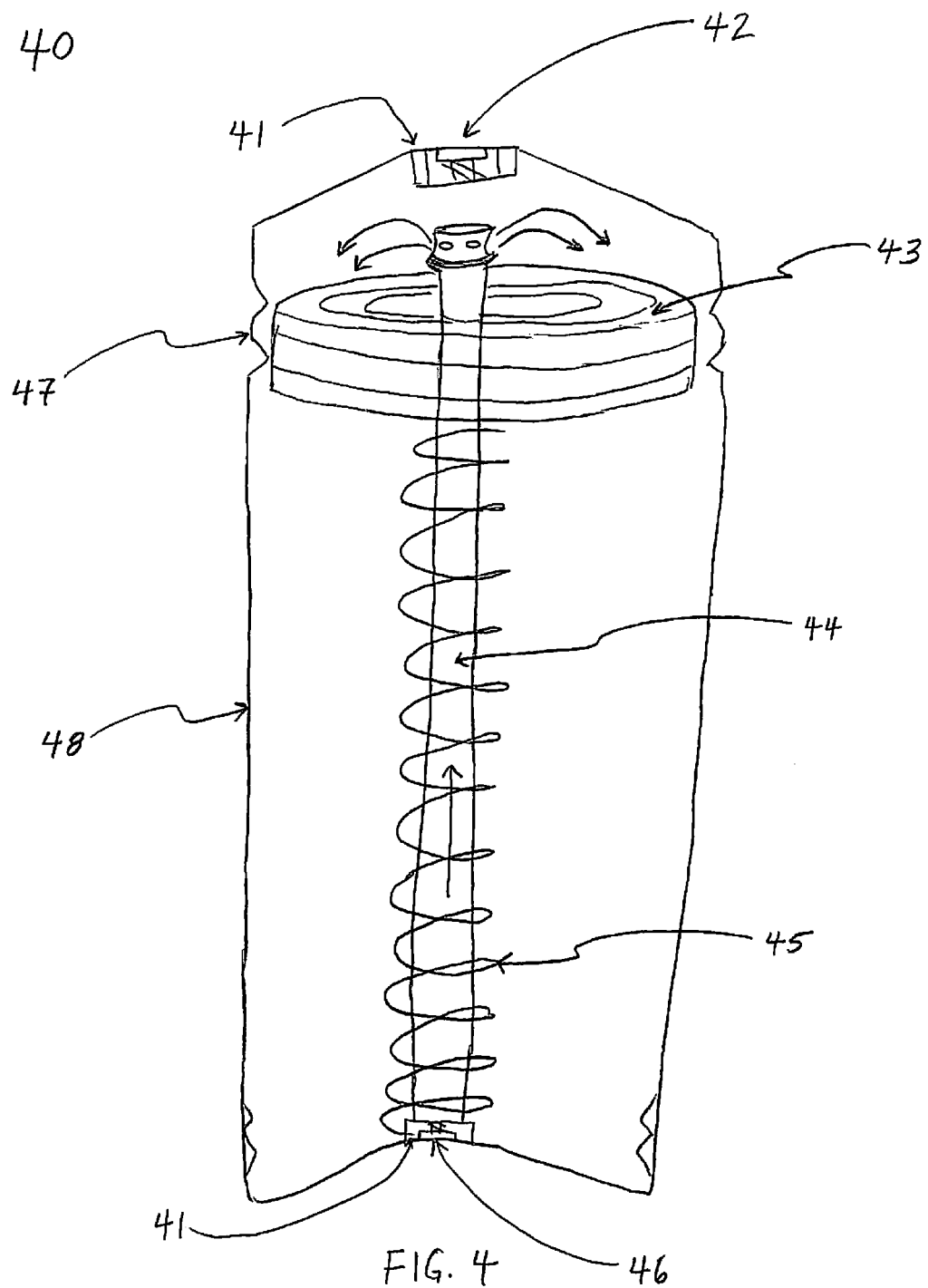
FIG. 4 illustrates an exemplary refillable grease gun reservoir utilizing an internal wiper plate that is refillable from the bottom of the reservoir.
Figure 5:
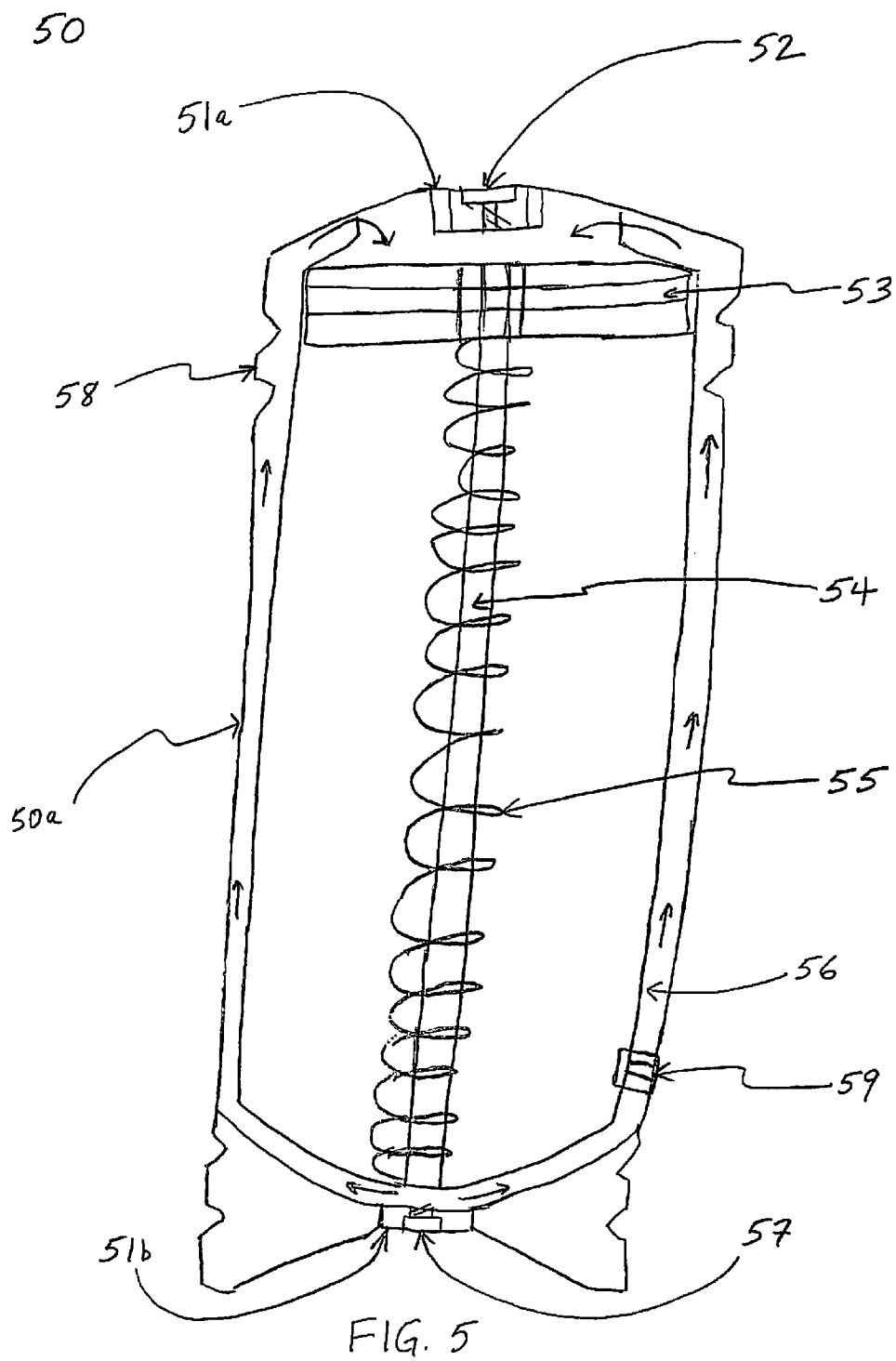
FIG. 5 illustrates an exemplary refillable grease gun reservoir utilizing an internal wiper plate that is refillable from the bottom and/or top of the reservoir.

A modification of the grease gun reservoir is shown in FIGS. 3-5. Grease guns may utilize a variety of methods of applying pressure to distribute grease, e.g., pressurized air, wiper plate. Though only two types are described in detail, any method of applying pressure to force grease from the reservoir known now or in the future is within the spirit and scope of the invention.

FIG. 3 illustrates an exemplary refillable grease gun reservoir utilizing an internal wiper plate that is refillable from the top of the reservoir. A reservoir tube 37 is equipped with a fitting/coupling 31, grease inlet/outlet port 32, and threads 36 similar to those in FIG. 1. The reservoir tube 37 contains a wiper plate 33 connected to a stem rod/grease guide 35 so that the wiper plate 33 is able to freely move up and down the stem rod/grease guide 35. The stem rod/grease guide 35 is coupled to the grease inlet/outlet port 32 so that grease may be delivered from the reservoir tube 37 through the stem rod/grease guide 35 and out the inlet/outlet port 32 to the grease gun. The reservoir body is refilled through the inlet/outlet port 32 such that the grease travels through the port to the reservoir tube 37 via the stem rod/grease guide 35. To assist with compression and movement of the wiper plate 33, a compression spring 34 may be employed depending on the particular application.

FIG. 4 illustrates an exemplary refillable grease gun reservoir utilizing an internal wiper plate that is refillable from the bottom of the reservoir 40. A reservoir tube 48 is equipped with a fitting/coupling 41a, wiper plate 43, and threads 36 similar to those in FIG. 3. However, because the reservoir is to be filled from the bottom of the tube, reservoir tube 48 is equipped with a separate fitting/coupling 41b and a grease outlet 42 for delivering grease to the grease gun and a separate grease inlet 46 for refilling the reservoir tube 48. The stem rod/grease guide 44 is coupled to the grease inlet 46 delivers grease from the grease inlet 46 to the top of the wiper plate 43 thereby filling the reservoir. Additionally, an optional compression spring 45 may be used to assist forcing grease from the reservoir.

FIG. 5 illustrates an exemplary refillable grease gun reservoir utilizing an internal wiper plate that is refillable from the bottom and/or top of the reservoir 50. A reservoir tube 50*a* is equipped with two fitting/couplings 51*a* and 51*b* as described above. At the top of the reservoir tube 50*a*, a grease inlet/outlet port 52 is used to for bi-directional flow of grease. A grease inlet port 57 is situated at the bottom of the reservoir tube 50*a* for refilling operations. The grease inlet port 57 is connected to a grease channel 56 situated inside the reservoir body 50*a* that directs grease to the top of the wiper plate 53. The wiper plate is situated within the reservoir body 50*a* and the grease channel 56. The wiper plate 53 is coupled and guide by a stem rod 54. An optional compression spring 55 may be used to assist forcing the grease from the reservoir. The reservoir tube may be filled using the grease inlet/outlet port 52 and/or the grease inlet port 57. When filling from the grease inlet/outlet port 52, the grease forces the wiper plate 53 down the stem rod 54 until full. When filling from the grease inlet port 57, the grease enters the grease channel and travels the length of the reservoir tube 50*a* until the grease forces the wiper plate 53 down the stem rod 54. The grease channel is equipped with a mechanism that enables one-way travel of grease from the inlet port 57 to the top of the wiper plate 53. This mechanism prevents grease escaping back through the grease channel when operating the grease gun. These mechanisms are well known in the art and will not be described in detail.

Figure 6:
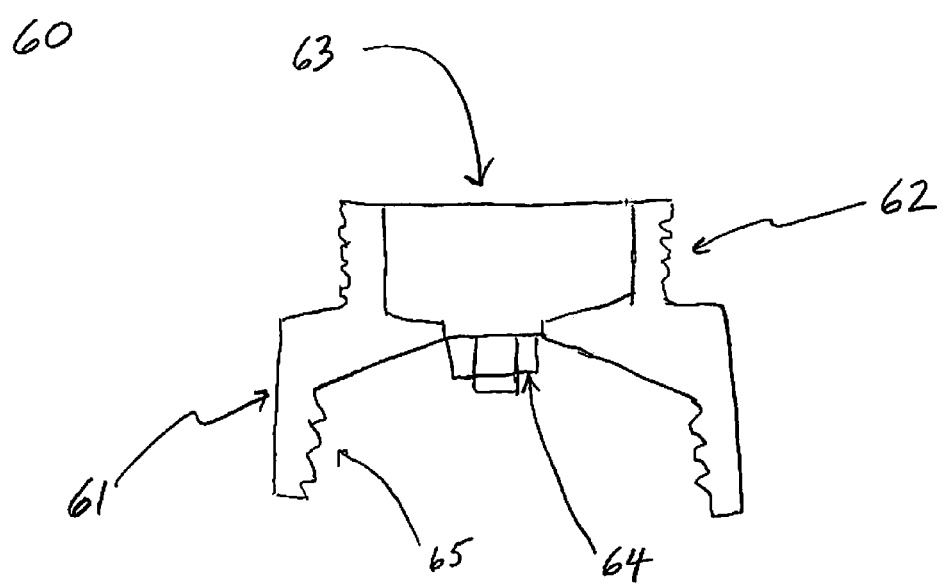
FIG. 6 illustrates an exemplary adapter ring.

The grease gun reservoir of the present invention may also be adapted for use with existing grease gun systems. FIG. 6 illustrates an exemplary adapter ring 60. The adaptor ring is a body 61 that has threads 62 situated at the top of the body 61 and on the outer edges such that the body may receive a grease gun apparatus. Inner threads 65 are situated at the bottom of the body 61 and on the inner edges of the body 61 such that the body 61 may receive a grease gun reservoir. A fitting/coupling 64 is situated within the bottom of the body 61 and within the cavity to accept the grease gun reservoir. A cavity 63 within the top of the body 61 accepts the grease gun connection. The cavity 63 will varies depending on the type of grease gun to be used.

Figure 7:
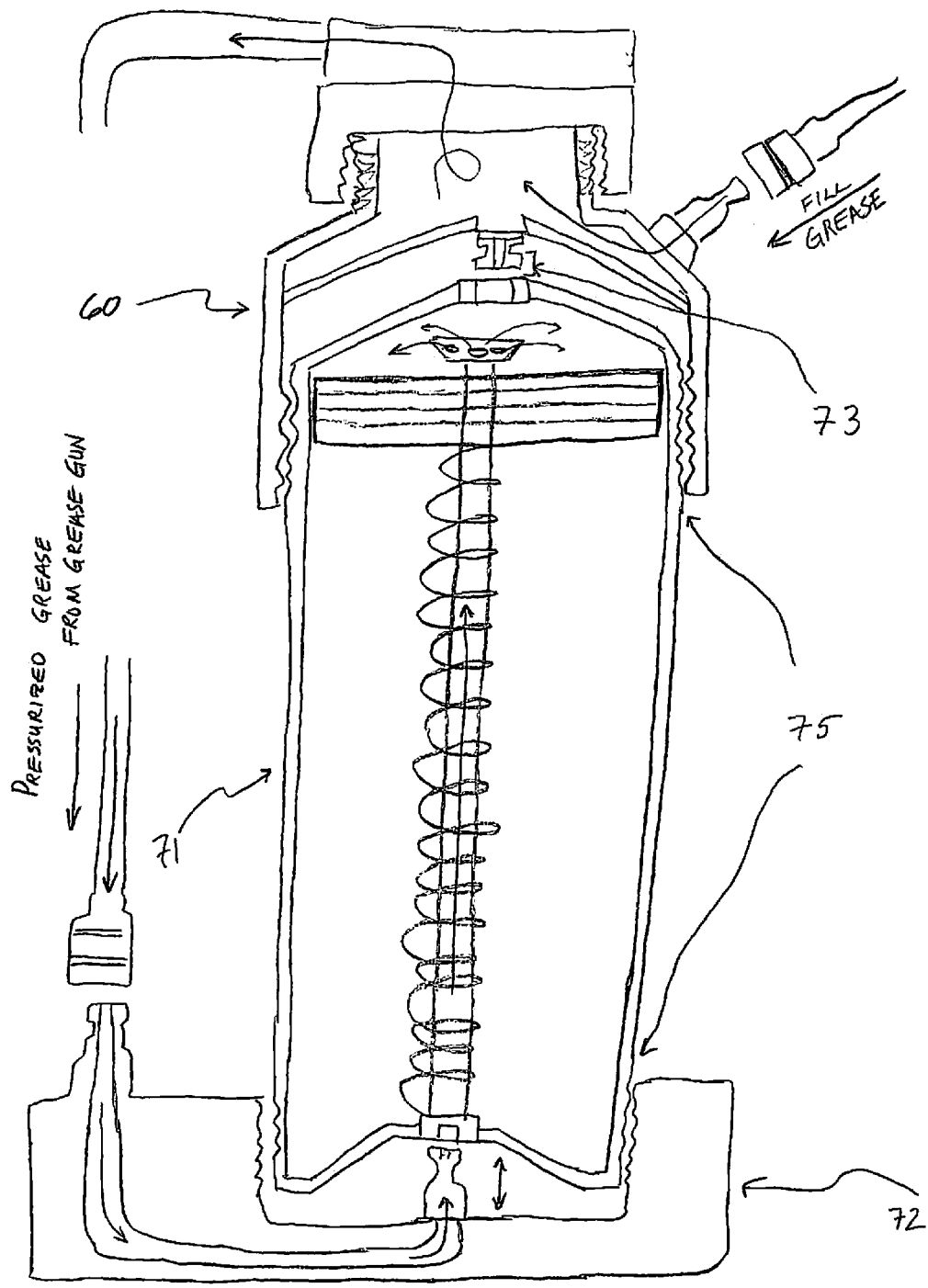
FIG. 7 illustrates an embodiment of adapter ring usage.

FIG. 7 illustrates an embodiment of adapter ring usage. A reservoir body 71 of the present invention is coupled to the adapter ring 60 by screwing the adapter ring onto the reservoir body 71 using the threads 75. The reservoir body 71 is also screwed into a docking station 72 via additional threads 75 on the bottom of the reservoir body 75. When the reservoir body 71 needs to be refilled with grease, the reservoir body 71 is partially unscrewed from the adapter ring 60 such that grease is unable to flow through the fitting/coupling 73. The reservoir body 71 is tightly screwed to the docking station such that a connection is made between the bottom of the reservoir body and the docking station 72. The grease may then be pumped into the reservoir body 71. Grease may also be pumped from a fill grease location utilizing the pressurized action of an attached grease gun and pumped from the grease gun through a docking station fitting/coupling 77 situated on the docking station 72 into the bottom of the reservoir body. When the reservoir body is filled, the reservoir body is unscrewed from the docking station 72. The adapter ring 60 is screwed tightly onto the reservoir body 71 such that a connection is made between the fitting/couplings 73 and a grease pathway to the grease gun in opened for application.

Figure 8:
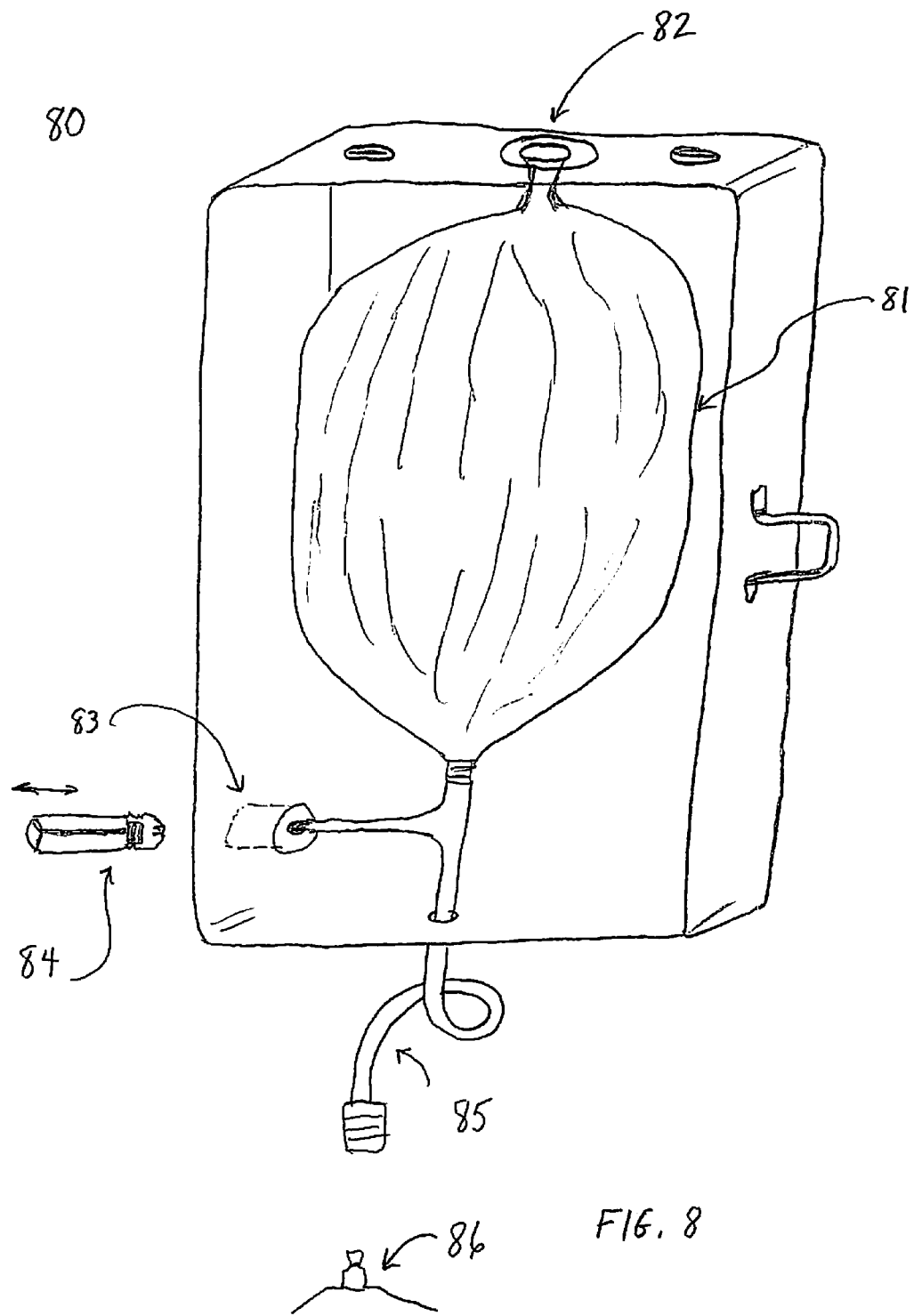
FIG. 8 illustrates an exemplary embodiment of a grease case for refilling a grease reservoir body.

FIG. 8 illustrates an exemplary embodiment of a grease case for refilling grease reservoir bodies. A grease case of the present invention provides for a re-useable, returnable, rechargeable, portable bulk storage and transport solution. A grease case may be of any size suitable to safely store, transport and transfer grease to the grease reservoir bodies described above. In various embodiments, a grease case may be in 2-½, 5 or 10 gallon sizes. In an exemplary embodiment as depicted by FIG. 8, a grease case 80 takes the form of a toolbox or a suitcase. Within the suitcase form, a bladder 81 contains grease to be delivered. The grease case 80 may also contain one or more pressure relief mechanisms 82 situated on the outer edge of the case. The grease case 80 is equipped with a grease reservoir body receptacle 83 to receive a grease reservoir body 84 for a refilling operation. When the grease reservoir is full, the grease reservoir body may is disengaged from the grease case receptacle and ready for use. The grease case 80 is optionally equipped with a hose fitted with a fitting/coupling 85 that can be used to connect to a grease gun 86, a recharger, or to drain the grease case 80.

Figure 9:
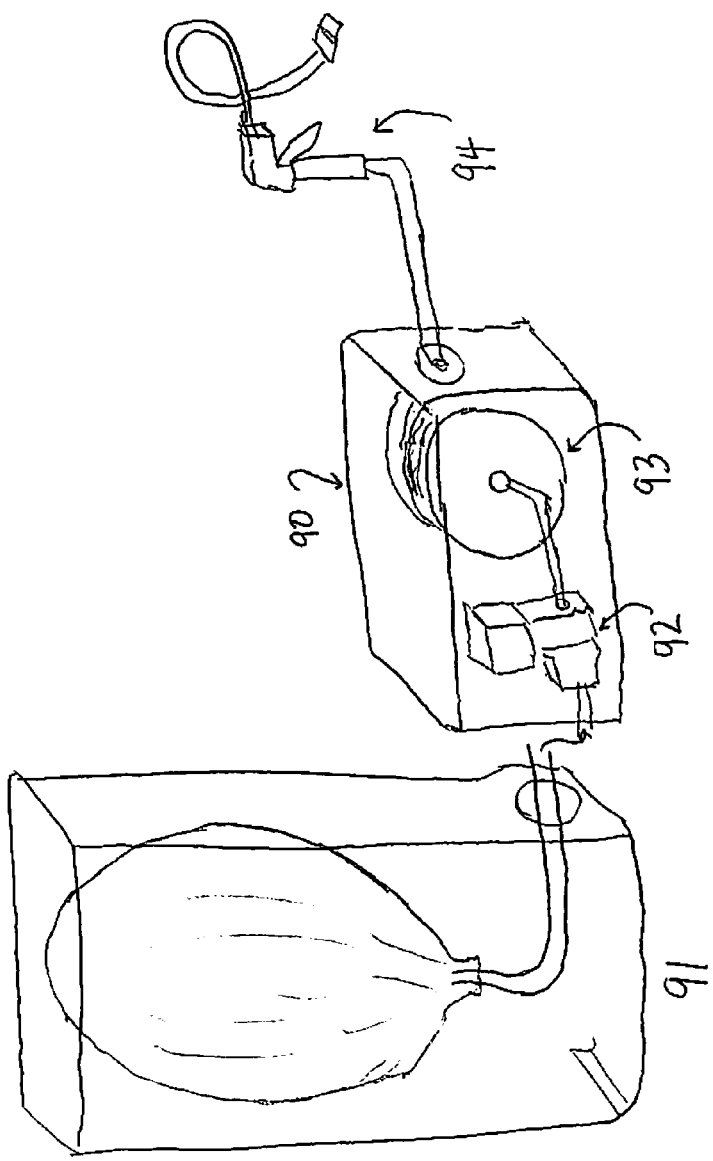
FIG. 9 illustrates a grease case utilizing an exemplary grease pump station.

FIG. 9 illustrates a grease case utilizing an exemplary grease pump station 90. A grease pump station 90 allows for an increased length of delivery hose, from a small retractable hose reel built into the pumping station and lends its self to a pressurized delivery system so that a control switch need not be extend to the end of the delivery hose or require the use of a wireless remote on/off controller at the end of the delivery hose. As a result, only a hand nozzle and trigger mechanism would be required at the hose's end. The grease case 91 is coupled to the grease pump station via a hose or tube typical in grease gun applications. The grease pump station 90 contains a pumping mechanism 92 and a retractable hose reel 93. The pumping mechanism 92 may be powered by a variety of means, for example, a rechargeable electric battery, a pressurized bladder accumulator, a manually induced pump or a remote air compressor assisted pump. The pumping mechanism may also contain a pressure sensor to sense loss of pressure in the grease line. The grease case 91 is snapped into the pumping station 90 so that a connection is made between the hose of the grease case 91 and the pumping mechanism 92 connection. When in use with a grease gun 94, the pressure sensor of the pumping mechanism 92 will sense the loss of pressure in the grease line when the trigger of the grease gun is pulled. This in turn would activate the pumping mechanism 92 and begin to pump grease from the grease case 91 through the grease line to the grease gun 94.

Although the above description may contain specific details, they should not be construed as limiting the claims in any way. Other configurations of the described embodiments of the invention are part of the scope of this invention. The descriptions and embodiments are not intended to be an exhaustive or to limit the invention to the precise forms disclosed. Accordingly, the appended claims and their legal equivalents should only define the invention, rather than any specific examples given.

What is claimed is:
1. A grease refill system for refilling a reservoir body comprising:
  an outer case;
  an inner case area situated within the outer case containing product to be dispensed;

one or more pressure relief mechanisms situated on the outer case extending from the inner case area;

a reservoir body receptacle coupled with the inner case area, the receptacle having a first dry break fitting/coupling; and a reservoir body having a second dry break fitting/coupling wherein the reservoir body is inserted into the reservoir body receptacle so that the first dry break fitting/coupling and the second dry break fitting/coupling engage so that the product to be dispensed may flow through the coupling from the inner case area into the reservoir body.

2. The grease refill system of claim 1 wherein the inner case area is a bladder.

3. A grease refill system for refilling a reservoir body comprising:

an outer case;

an inner case area situated within the outer case, the inner case containing product to be dispensed;

one or more pressure relief mechanisms situated on the outer case extending from the inner case area;

a reservoir body receptacle coupled with the inner case area, the receptacle having a first dry break fitting/coupling;

a reservoir body having a second dry break fitting/coupling wherein the reservoir body is inserted into the reservoir body receptacle so that the first dry break fitting/coupling and the second dry break fitting/coupling engage so that the product to be dispensed may flow through the coupling from the inner case area into the reservoir body; and a pumping station operatively coupled to the inner case area; and a grease gun having a trigger, the grease gun operatively coupled to the pumping station wherein upon activation of the trigger, the pumping station pumps product from the inner case area to the grease gun.

\* \* \* \* \*